March 30, 1926.                    C. S. ALLEN                     1,578,247
                              METAL CUTTING SHEARS
                            Filed March 24, 1925        2 Sheets-Sheet 2
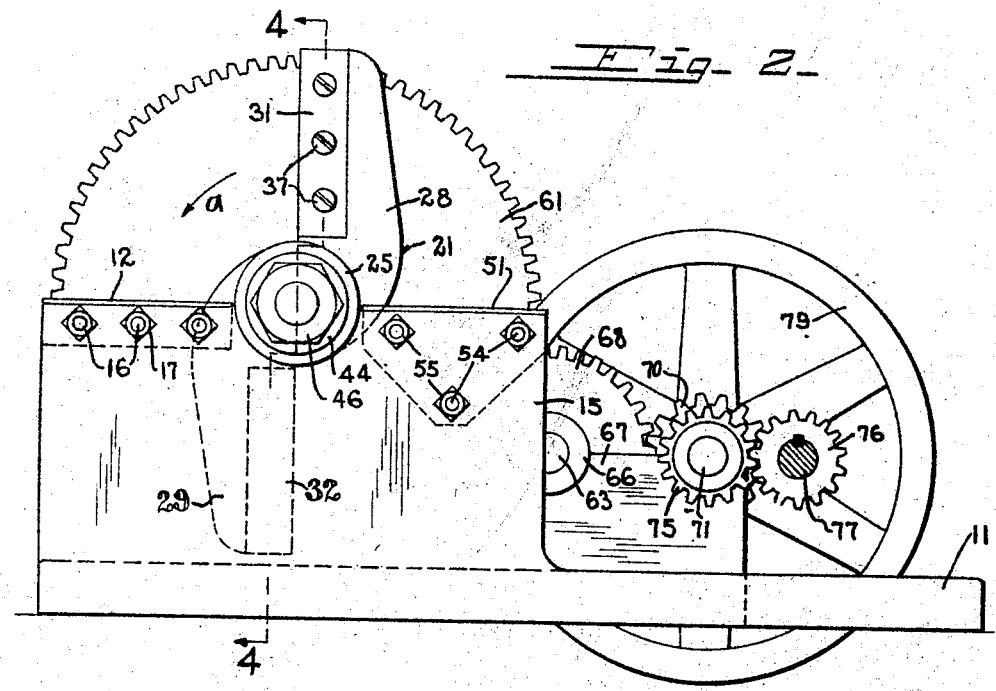
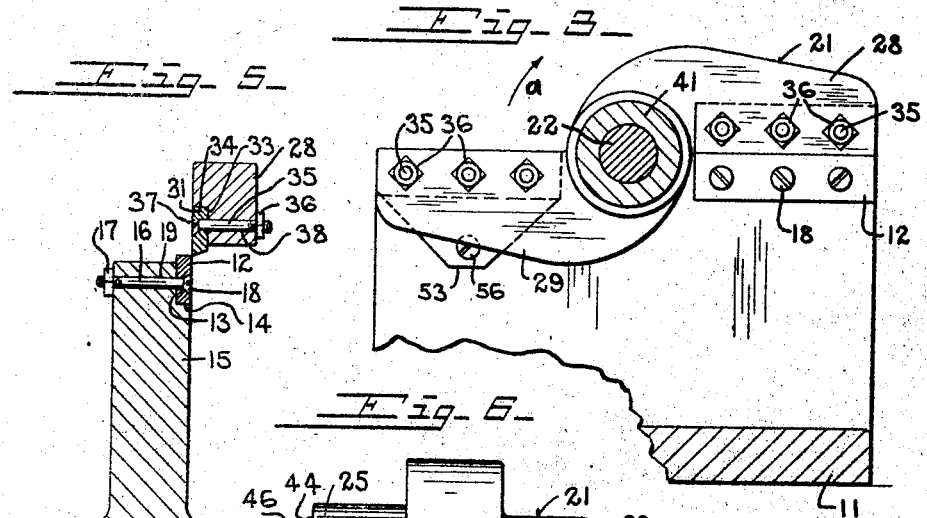
INVENTOR.

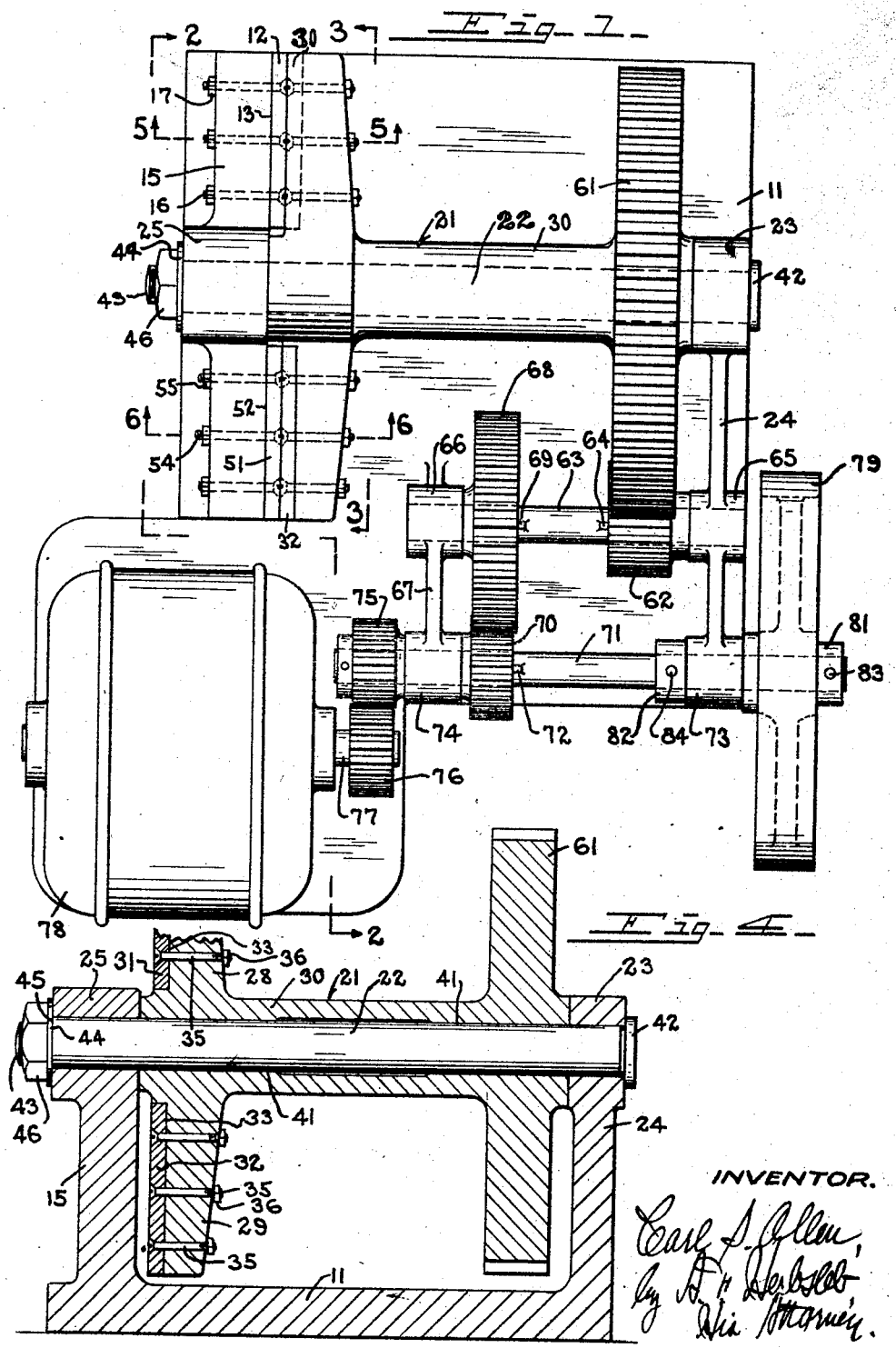

Patented Mar. 30, 1926.

1,578,247

UNITED STATES PATENT OFFICE.

CARL S. ALLEN, OF CINCINNATI, OHIO.

METAL-CUTTING SHEARS.

Application filed March 24, 1925. Serial No. 18,046.

*To all whom it may concern:*

Be it known that I, CARL S. ALLEN, a citizen of the United States, residing at Cincinnati, in the county of Hamilton and State of Ohio, have invented certain new and useful Improvements in Metal-Cutting Shears, of which the following is a specification.

My invention relates to metal cutting shears employable principally for cutting scrap metals and materials, and is intended primarily for heavy cutting, it being understood that the rotating arms hereinafter described may have a weight of several tons, although it is obvious that the shears may be made in smaller sizes if desired.

It is the primary object of my invention therefore to so construct a shears of this character that great cutting force is applied by the same, and to construct and arrange the various parts so that such cuttings are performed with a minimum of strains upon the working parts, and so that great power is applied to the cutting operations, and, further, to so construct and arrange the parts concerned in the cutting operations that the relatively stationary knife is clear of obstruction above it between cutting operations for ready insertion of the materials to be cut with simple movements quickly effected.

It has been a practice heretofore to cut materials of this character with a shears having so-called alligator jaws, comprising a pivoted cutting jaw to which a reciprocating movement was applied up and down with relation to a relatively stationary jaw, with the result that only a comparatively small opening was permitted between the jaws for insertion of material, and to impart feeding movements in several directions to the heavy material being cut between cutting operations, for instance, first, a releasing movement toward the outer ends of the jaws and the points of greatest opening between the jaws upon the opening movement of the movable pivoted jaw, second, a feeding movement lateral with relation to the jaws for moving the material into the plane of the jaws, and, third, an inserting movement in the plane of the jaws toward the pivoted end of the reciprocating jaw or into the throat of the jaws.

This latter movement was limited, as the separation between the jaws at and adjacent to the throat was small, so that the bulkier materials could be inserted only slightly, where the force necessary to perform the cutting was greatest, and also making it necessary to perform several cutting operations in the same plane in the material in order to sever the piece desired.

It is the object of my invention to avoid these objections, and to provide a metal cutting shears in which the space above the relatively stationary blade is entirely free of obstruction, so that only one feeding movement in one direction of the material to be cut is required, namely, a movement at right angles to the plane of the blades for feeding the material in the one direction or path into a position above the relatively stationary cutter-blade.

It is the object of my invention, further, to provide a rotatable cutter-arm which moves toward the relatively stationary blade during the cutting operation, and continues in said movement for moving entirely out of the path of the material, so that the material may be fed transversely of the cutter-arm into its next cutting position, while the cutter-arm moves in a rotary path upwardly at the other side of its axis of rotation so as to reach its next cutting position for cutting the material, which has meanwhile been moved into such cutting position.

It is the object of my invention, further, to provide a plurality of such rotating cutter-arms having cutter-blades thereon, the cutter-arms and blades being oppositely disposed, and to provide a resistance-plate, so that while one cutter-arm and its blade is performing its cutting operation, the other cutter-arm and its blade resists said cutting strain by coaction with the resistance-plate, and, further, to provide continuously rotating means for continuously rotating a rotatable cutter-frame on which the rotatable cutting means is mounted.

The invention will be further readily understood from the following description and claims, and from the drawings, in which latter:

Fig. 1 is a plan view of my improved device, showing the cutter-blades in cutting relation.

Fig. 2 is a front elevation of the same, partly in section on the line 2—2 of Fig. 1, and showing the rotating cutter-blades in intermediate position.

Fig. 3 is a cross-section of the latter, taken on the line 3—3 of Fig. 1, partly broken away.

Fig. 4 is an axial section of the rotary cutter-frame and its mounting means, taken on the line 4—4 of Fig. 2, partly broken away.

Fig. 5 is a detail in cross-section, taken on the line 5—5 of Fig. 1, showing the coactive relation between cutter-blades; and, Fig. 6 is a vertical section on the line 6—6 of Fig. 1 showing the coactive relation between the rotating cutter-blade and the resistance-plate.

The base of the machine is represented at 11. This base is a massive base to effectively resist strains by its weight and structure. A relatively stationary cutter-blade 12 is secured to the base, being located in a rabbet 13 on a shoulder 14 in a wall 15 of the base, and fixed to said wall by means of bolts 16 and nuts 17, the bolts being shown as having countersunk heads 18 in holes in the cutter-blade and passing through holes 19 in the wall.

A rotatable frame 21 is rotatable on a shaft 22, located in a bearing 23 on an upward projection 24, at the rear of the base, and in a bearing 25 in the front wall of the base adjacent to the cutter-blade 12. This rotatable frame has thereon a cutter-blade or cutter-blades coacting with the relatively stationary cutter-blade, and is exemplified as comprising arms 28, 29, extending in opposite directions laterally from the central elongated hub 30 of the rotatable frame.

This rotatable frame and the arms are preferably massive for imparting great strength thereto. Rotatable blades 31, 32, are fixed to the respective arms. Each of these blades is shown as fixed to its arm by being received in a rabbet 33 therein against a shoulder 34, bolts 35 and nuts 36 clamping the cutter-blade in place. The bolts are shown as having countersunk heads 37 received in countersunk recesses in the cutter-blade and extending through holes 38 in the arm.

The rotatable frame preferably rotates about the shaft 22 on bearings 41 in said rotatable frame, the shaft being fast in the bearings 23, 25, one end of the shaft having a flange 42 for locating the same with relation to the bearing 23, and the other end of the shaft having a reduced end 43, which is threaded, a washer 44 bearing against a shoulder 45 on said shaft and the outer end of the bearing 25. A nut 46 threaded over the reduced end clamps the washer in place and holds the shaft endwise.

The relatively stationary cutter-blade 12 is located at one side of the axis of rotation of the rotatable frame. A resistance-plate 51, coacting with the rotating cutter-blades, is at the other side of the axis of rotation of the rotatable frame, being shown fixed to the base, as by being received in a rabbet 52 in the wall 15 of the base, and resting upon a shoulder 53, bolts 54 and nuts 55 clamping the resistance-plate in place, the heads 56 of the bolts being shown countersunk in countersunk recesses in the plate and the bolts passing through holes 57 in the wall of the base.

The rotatable arms are subjected to great lateral tilting strains during their coaction with the relatively stationary cutter-blade in cutting materials. In order to maintain proper cutting relation with a shearing effect between the coacting cutter-blades and for resisting these lateral tilting stresses, the cutter-blade on the rotating arm opposite to the rotating arm which is performing the cutting function is arranged to coact with the resistance-plate, having a wiping action therealong in upward direction for receiving the resultant lateral thrust due to the cutting action of the cutter-arm in cutting position.

Means are provided for continuously rotating the rotatable frame, exemplified as a large massive gear 61, which is shown integral with the rotatable frame. A pinion 62 meshes with the gear 61, and is fast on a shaft 63, as by a key 64. The shaft is rotatable in bearings 65, 66, on upward projections 24, 67, and has a gear 68 fast thereon, as by means of a key 69. A pinion 70 meshes with the gear 68, and is fast on a shaft 71, as by a key 72. The shaft 71 is rotatable in bearings 73, 74, on the upward projections 24, 67, of the base, and has a gear 75 fast thereon. The gear 75 is meshed by a pinion 76 fast on the armature-shaft 77 of an electric motor 78 mounted on the base.

A fly-wheel 79 is fast on the shaft 71. The shaft 71 is held endwise in its bearings. Collars 81, 82, are secured to said shaft by pins 83, 84. The collar 81 is at the outer side of the fly-wheel 79 and the collar 82 is at the inner end of the bearing 73. The fly-wheel rotates much more rapidly than the rotatable knife-frame, due to the gearing connections therebetween, and has the effect of maintaining the rotatable frame in regular rotating relation and overcoming the resistances due to the cutting actions, and maintains a forceful rotating power during the cutting moments.

In operation, the material to be cut, for instance scrap metal, is fed preferably from the front of the machine, along which the wall 15 extends, across the lower relatively stationary cutter-blade 12, the operator moving the material in a direction at substantially right angles to the plane of the cutter-blades. The rotatable cutter-blades rotate in the direction of the arrow $a$.

This feeding movement of the material may take place immediately after one of the rotatable arms with its cutter-blade has passed the relatively stationary cutter-blade in severing a piece of the material. The rotating arm continues in its downward movement after such severing, and passes below the horizontal plane of the relatively stationary cutter-blade 12.

As soon as this arm has so passed this horizontal plane, the space above the stationary knife is entirely free of obstruction, so that the material may be given an additional feeding movement across the relatively stationary cutter-blade in a direction at substantial right angles thereto, and close to the inner end of the cutter-blade, that is, closely adjacent to the axis of rotation of the rotatable frame. These feeding movements are in practice usually short for cutting the material into short pieces.

This clearance above the relatively stationary cutter-blade continues until the next rotating cutter-blade arrives at cutting positions, giving ample time for the operator to properly place his material.

An intermediate cutter position of the cutter-blades is exemplified in Figs. 2 and 3, in which the advancing rotating cutter-blade is shown at right angles to the position of the relative stationary cutter-blade, and exemplifies the wide mouth between the cutter-blades into which material may be fed and the free positions of the cutter-blades for feeding movements of the material.

The cutter-blades continue in their rotating movement, and the next alternately rotating cutter-blade begins to cut the material. In the meantime the rotating cutter-blade which has last performed its cutting function has arrived in position for coaction with the resistance-plate, in order to resist and overcome the laterally tilting stresses upon the rotating cutter-arms by the cutting operation.

The cutting operations are repeated in rapid sequence, and the feeding movements are also performed with rapidity, as it is necessary in my device to move the material in only one direction, namely, in a path at right angles to the relatively stationary cutter-blade. The rotating cutter-blades are also continuously propelled in the same direction by means of powerful gearing acted on by a powerful motor, with a fly-wheel acting to maintain uniformity of speed of the rotating cutter-blades by overcoming the peaks of resistance thereto during the cutting operation.

Having thus fully described my invention what I claim as new, and desire to secure by Letters Patent, is:

1. A metal cutting shears comprising a base, a relatively stationary cutter-blade fixed thereto, a rotatable frame comprising oppositely laterally extending arms, a cutter-blade fixed to each of said arms coacting alternately with said first-named cutter-blade, and a resistance-plate fixed to said base with which said second-named cutter-blades alternately coact, constructed and arranged whereby when one of said second-named cutter-blades coacts with said first-named cutter-blade the other of said second-named cutter-blades coacts with said resistance-plate to counteract the lateral cutting strain on said oppositely extending arms.

2. A metal cutting shears comprising a base, a rotatable frame comprising a pair of oppositely laterally extending arms having rotary paths of travel, a cutter-blade fixed to each of said arms, a relatively stationary cutter-blade on said base at one side of the axis of rotation of said rotatable frame, a resistance-plate on said base at the other side of said axis of rotation, said first-named cutter-blades coacting alternately with said second-named cutter-blade during their downward movements and coacting alternately with said resistance-plate during their upward movements, and one of said rotating cutter-blades coacting with said relatively stationary cutter-blade while the other of said rotating cutter-blades coacts with said resistance-plate to resist the cutting stresses on said arms during cutting operations.

3. A metal cutting shears comprising a base, a rotatable frame comprising a pair of oppositely laterally extending arms having rotary paths of travel, a cutter-blade fixed to each of said arms, a relatively stationary cutter-blade fixed to said base at one side of the axis of rotation of said rotatable frame, a resistance-plate fixed to said base at the other side of said axis of rotation, said first-named cutter-blades coacting alternately with said second-named cutter-blade during their downward movements and coacting alternately with said resistance-plate during their upward movements, one of said rotating cutter-blades coacting with said relatively stationary cutter-blade while the other of said rotating cutter-blades coacts with said resistance-plate to resist the cutting stresses on said arms during cutting operations, driving means, and gearing connecting said driving means with said rotatable frame for continuously rotating the latter.

In testimony whereof, I have hereunto signed my name.

CARL S. ALLEN.